(12) United States Patent
Ramsey et al.

(10) Patent No.: US 9,009,921 B1
(45) Date of Patent: Apr. 21, 2015

(54) MOTORIZED EXTENSION POLE

(71) Applicants: Mark J. Ramsey, Omaha, NE (US); Mark C. Ramsey, Omaha, NE (US)

(72) Inventors: Mark J. Ramsey, Omaha, NE (US); Mark C. Ramsey, Omaha, NE (US)

( * ) Notice: Subject to any disclaimer, the term of this patent is extended or adjusted under 35 U.S.C. 154(b) by 0 days.

(21) Appl. No.: 14/510,275

(22) Filed: Oct. 9, 2014

Related U.S. Application Data

(63) Continuation-in-part of application No. 13/564,833, filed on Aug. 2, 2012, now Pat. No. 8,882,166.

(51) Int. Cl.
| | |
|---|---|
| *B25G 1/04* | (2006.01) |
| *B25G 1/10* | (2006.01) |
| *E04D 13/076* | (2006.01) |
| *B05C 17/02* | (2006.01) |
| *A01G 3/047* | (2006.01) |
| *B27B 17/00* | (2006.01) |

(52) U.S. Cl.
CPC .. *B25G 1/04* (2013.01); *B25G 1/10* (2013.01); *E04D 13/0765* (2013.01); *B05C 17/0245* (2013.01); *A01G 3/0475* (2013.01); *B27B 17/00* (2013.01)

(58) Field of Classification Search
CPC ...... B25G 1/04; B27B 17/00; E04D 13/0765; Y10T 16/473; A01G 3/0475; A01G 3/053; A01G 3/085; B05B 15/064; B05C 17/0205; B25F 5/026

USPC .............................. 16/429, 436; 294/209, 210
See application file for complete search history.

(56) References Cited

U.S. PATENT DOCUMENTS

| | | | |
|---|---|---|---|
| 4,062,156 A * | 12/1977 | Roth | 52/111 |
| 4,793,197 A * | 12/1988 | Petrovsky | 74/89.35 |
| 4,911,039 A | 3/1990 | Lubbock et al. | |
| 4,924,573 A * | 5/1990 | Huddleston et al. | 30/272.1 |
| 5,493,758 A | 2/1996 | Carmien | |
| 5,881,601 A * | 3/1999 | Hammer | 74/422 |
| 6,378,922 B1 | 4/2002 | Troudt | |
| 6,588,065 B1 * | 7/2003 | Tucker, III | 16/429 |
| 7,014,546 B1 | 3/2006 | Birk | |
| D519,820 S | 5/2006 | Newman et al. | |
| 7,677,476 B2 | 3/2010 | Burdsall et al. | |
| 7,913,345 B2 | 3/2011 | Dayton et al. | |
| 8,024,995 B2 | 9/2011 | Dayton et al. | |
| 8,510,910 B1 * | 8/2013 | Ramsey | 15/405 |
| 2008/0189870 A1* | 8/2008 | Dayton et al. | 7/167 |

\* cited by examiner

*Primary Examiner* — Stephen Choi

(74) *Attorney, Agent, or Firm* — Dennis L. Thomte; Thomte Patent Law Firm LLC

(57) ABSTRACT

A motorized extension pole including a first hollow pole member having a second hollow pole member telescopically mounted in said first pole member. The second pole member is selectively moved between extended and retracted positions with respect to said first pole member by a battery powered drive motor.

2 Claims, 6 Drawing Sheets

MOTORIZED EXTENSION POLE

CROSS REFERENCE TO RELATED APPLICATION

This is a Continuation-In-Part Application of application Ser. No. 13/564,833, filed Aug. 2, 2012 entitled MOTORIZED EXTENSION POLE.

BACKGROUND OF THE INVENTION

1. Field of the Invention

This invention relates to a length-adjustable extension pole and more particularly to a length-adjustable extension pole including a battery powered, variable speed, reversible motor which extends and retracts the inner pole member with respect to the outer pole member of the extension pole.

2. Description of the Related Art

Extension poles have been available for many years to enable a person to clean windows which are located above the person's normal reach. Extension poles are also used to paint areas of buildings which are located above the person's normal reach. Extension poles may also be used to string lights and ornaments on trees during the holiday season.

Most extension poles include an elongated outer pole member, having first and second ends, which telescopically receives an elongated inner pole member having first and second ends. The inner pole member is longitudinally adjustable with respect to the outer pole member and is usually held in place by a threaded collet at the second end of the outer pole member to clamp the pole members together.

When it is necessary to adjust the length of the extension pole, the collet is loosened to permit the inner pole member to be slidably adjusted with respect to the outer pole member. When the adjustment has been made, the collet is again tightened. The adjustment process described above may be awkward since the extension pole must be lowered to enable the person using the pole to loosen the collet, adjust the length of the pole, and then tighten the collet. The adjustment is made even more inconvenient since there will be a paint roller, window cleaning attachment, chain saw, hedge trimmer, gutter cleaner or other object secured to the upper end of the inner pole member.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A motorized extension pole is provided which includes a first elongated, hollow pole member having first and second ends. A second elongated, hollow pole member, having first and second ends, is telescopically mounted in the first pole member. The second end of the second pole member protrudes from the second end of the first pole member. The second pole member is telescopically movable between retracted and extended positions with respect to the first pole member.

A battery powered, variable speed drive motor is secured to the first end of the first pole member with the drive motor being selectively reversible. The drive motor includes a rotatable driven member. An elongated externally threaded screw or bolt member, having first and second ends, has its first end thereof coupled to the driven member for rotation therewith in a first direction and a second direction opposite to the first direction. The screw member is threadably coupled to the second pole member whereby rotation of the screw member in the first direction by the drive motor causes the second pole member to move from its retracted position towards its extended position. The rotation of the screw member in the second direction by the drive motor causes the second pole member to move from its extended position towards its retracted position.

In the preferred embodiment, the extension pole of this invention includes structure which prevents the second pole member from rotating, with respect to the first pole member, as it moves between its retracted and extended positions and which prevents the second pole member from rotating with respect to the first pole member, as it moves between its extended and retracted positions.

It is therefore a principal object of the invention to provide an improved extension pole.

A further object of the invention is to provide a motorized extension pole.

A further object of the invention is to provide an extension pole wherein the inner pole member of the extension pole is telescopically moved with respect to the outer pole member by means of a battery powered motor.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a perspective view illustrating the extension pole of this invention being utilized to roll paint onto a wall or the like;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 3:
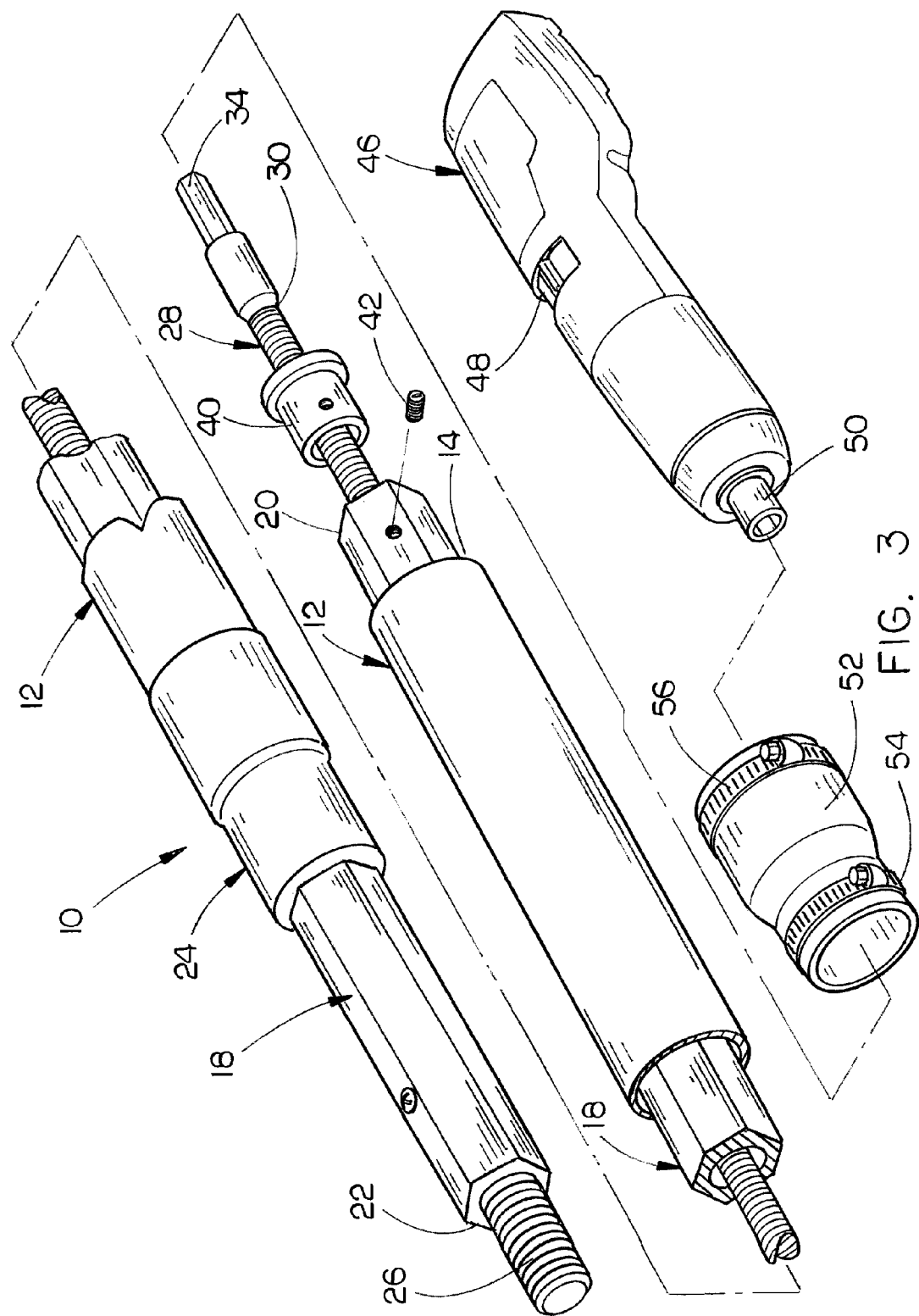
FIG. 3 is a partial exploded perspective view of the extension pole of this invention.
Figure 6:
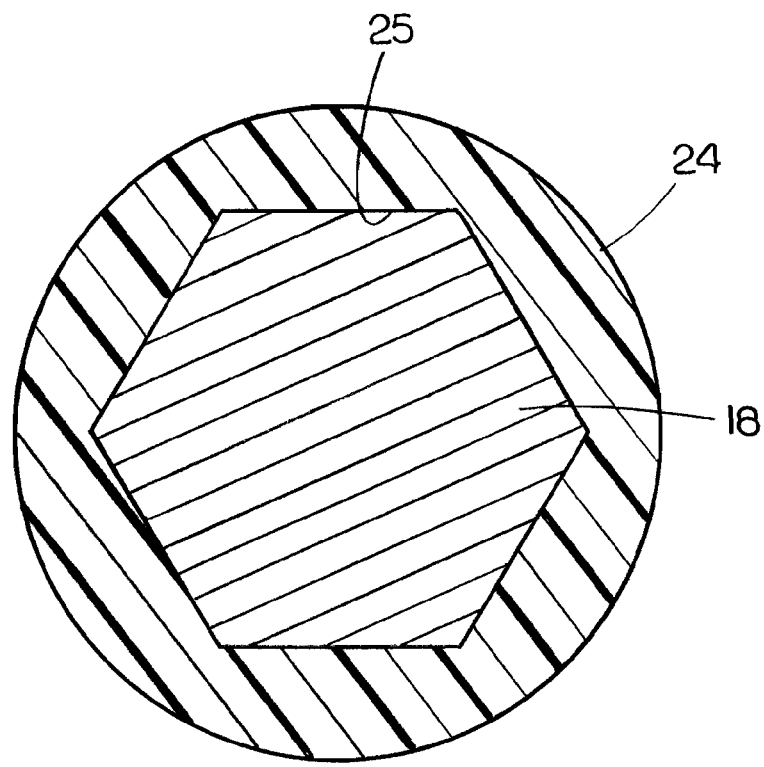
FIG. 6 is a partial sectional view of the extension pole of this invention wherein the inner pole member has a hexagonal cross-section and the outer pole has a fitting at one end thereof which has a hexagonal-shaped central opening.
Figure 7:
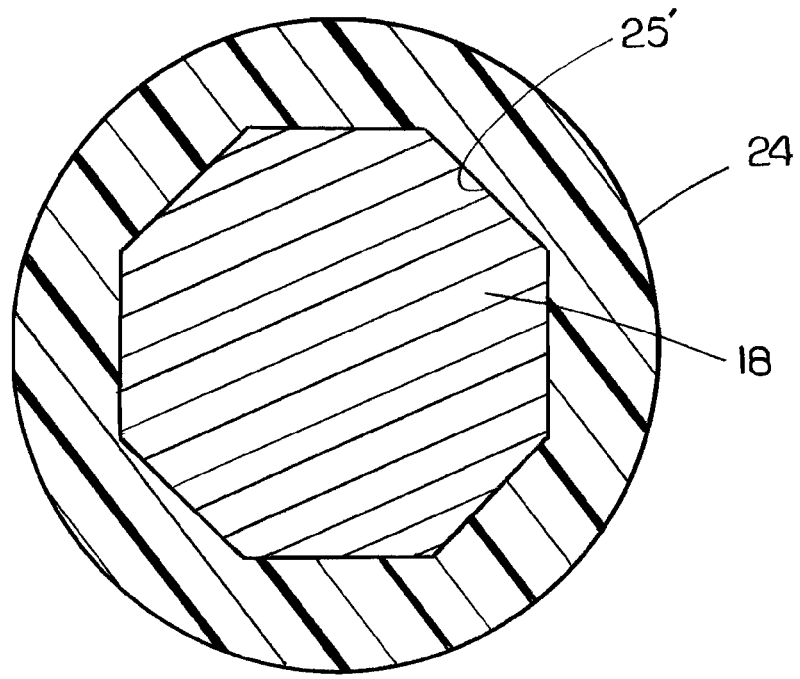
FIG. 7 is a partial sectional view of a modified form of the extension pole wherein the inner pole member has an octagonal cross-section and wherein the outer pole member has a fitting at one end thereof which has an octagonal-shaped central opening.

The motorized extension pole of this invention is referred to by the reference numeral 10. Extension pole 10 includes an elongated hollow outer pole member 12 having a first end and a second end. An elongated hollow inner pole member 18, having a first end 20 and a second end 22, is telescopically slidably received within pole member 12. Pole member 18 may have a hexagonal, octagonal or a cylindrical cross-section. If the pole member 18 has a hexagonal cross-section as seen in FIGS. 3 and 6, a fitting 24, having a hexagonal-shaped bore 25, is mounted on the end 16 of pole member 12 to prevent rotation of pole member 18 with respect to pole member 12. If the pole member 18 has an octagonal cross-section, as seen in FIG. 7, the fitting 24 will have an octagonal-shaped bore 25' to prevent rotation of pole member 18 with respect to pole member 12. In a conventional extension pole, some means is provided to retain the pole member 18 in its various longitudinal positions with respect to pole member 12. If pole member 18 has a cylindrical cross-section, a conventional collet will be mounted on the second end of the pole member 12 to clamp pole member 18 in its various selective positions with respect to pole member 12 in conventional fashion. However, in the instant invention, there is no need to provide such a collet or other structure to clamp the pole member 12 to the pole member 18.

Regardless of whether the pole member 18 has a hexagonal, octagonal or cylindrical cross-section, the second end of the pole member 18 will have a threaded stud 26 at the outer end thereof to which objects such as a paint roller 28 may be attached. A chain saw, hedge trimmer, window cleaner or gutter cleaner could also be attached to the threaded stud 26.

Figure 4:
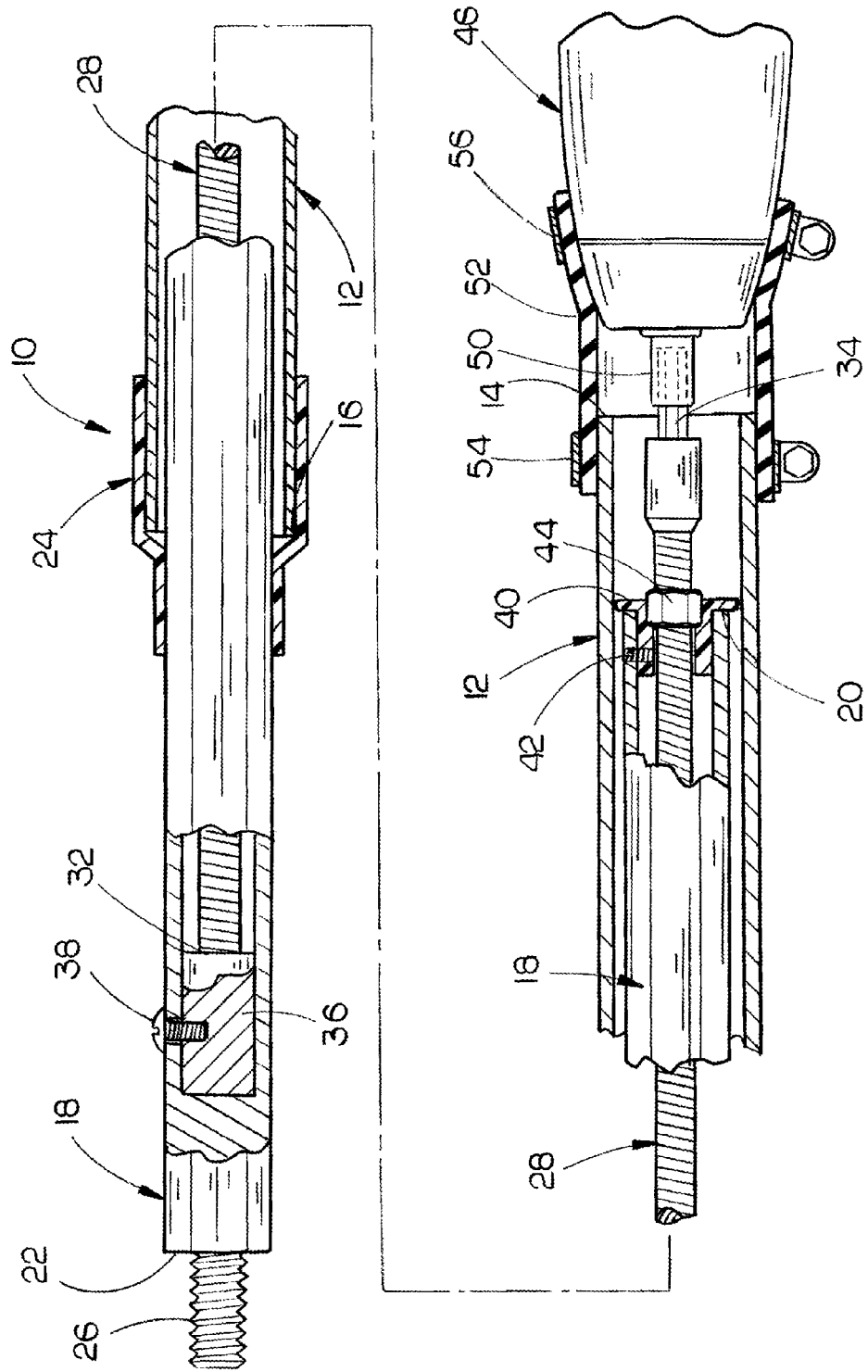
FIG. 4 is a partial sectional view of the extension pole of this invention.

An elongated threaded screw or bolt member 28 is positioned in the interior of pole member 18. Screw member 28 will be described as having a first end 30 and a second end 32. A fitting 34 is secured to the first end 30 of screw member 28 and a fitting 36 is secured to the second end 32 of screw member 28. Fitting 36 rotatably receives the end 32 of screw member 28. Fitting 36 is held in place with respect to pole member 18 by screw 38 as seen in FIG. 4. Collar 40 is secured to pole member 18 at end 20 by screw 42 as seen in FIG. 4. Internally threaded nut 44 is fixed to collar 40 by any convenient means such as adhesive, press-fit, etc.

The numeral 46 refers to a conventional battery driven tool such as a screw driver 44, the motor of which is selectively reversible and turned on and off by the thumb switch 48. The motor of the tool 46 is also a variable speed motor. Tool 46 includes a driven, rotatable socket 50 which is driven by the motor of the tool 46 in conventional fashion.

Tool 46 is attached to the lower end of pole member 12 by any convenient means such as a sleeve 52, the ends of which are clamped onto the pole member 12 and the tool 46 by clamps 54 and 56 respectively. As seen in FIG. 4, when the tool 46 is secured to the lower end of pole member 12, socket 50 receives fitting 34 so that rotation of socket 50 causes screw member 28 to be rotated.

The rotation of screw member 28 in one direction by tool 46 causes pole member 18 to be moved outwardly with respect to pole member 12 to increase the length of the extension pole 10. The rotation of screw member 28 in the opposite direction causes pole member 18 to be moved inwardly with respect to pole member 12 thereby decreasing the length of the extension pole 10. The extension and retraction of pole member 18 with respect to pole member 12 is accomplished without rotation of pole member 18 since nut 44 is fixed to collar 40 which is fixed to pole member 18 which is fixed against rotation with respect to pole member 12 by fitting 24.

Figure 1:
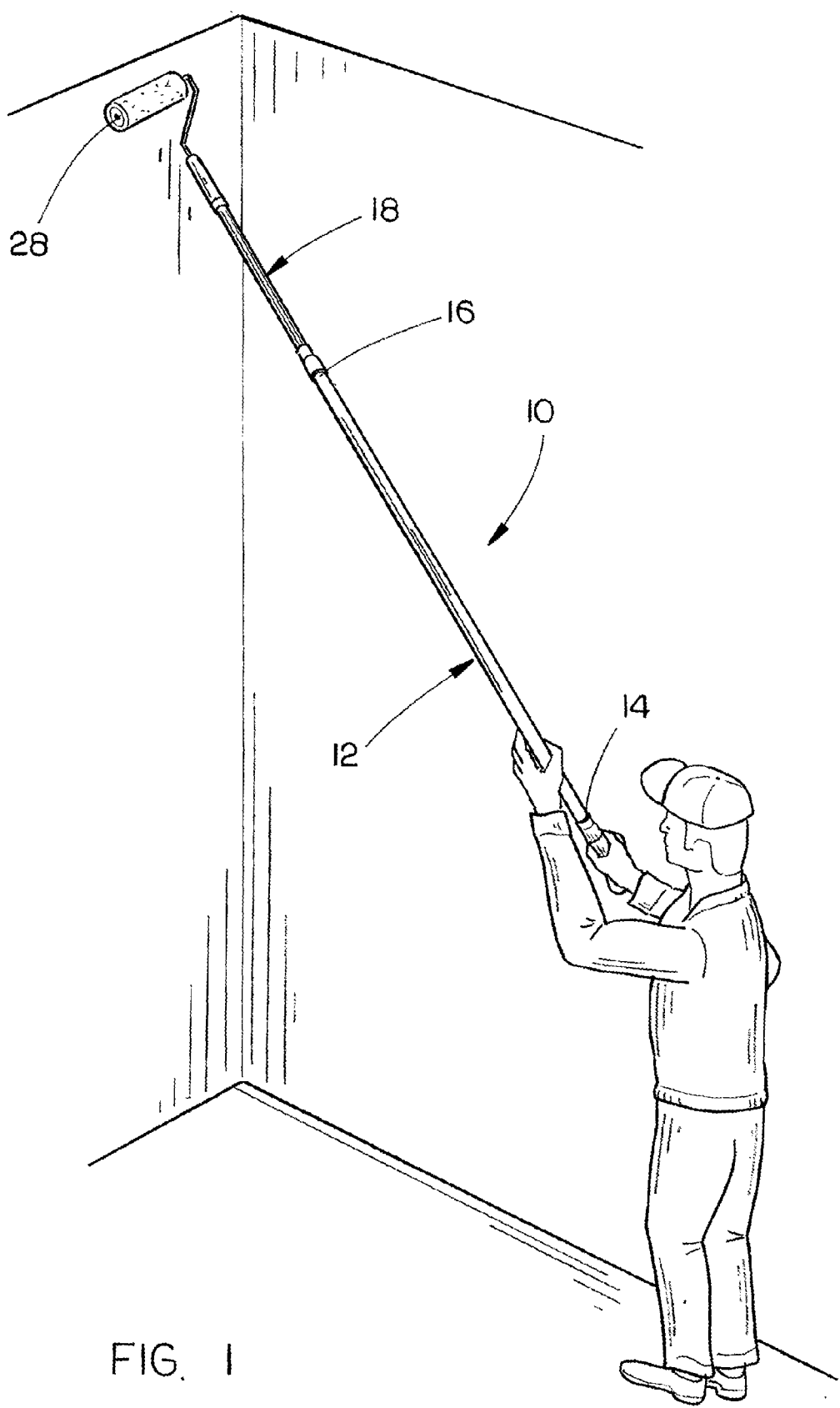
Figure 2:
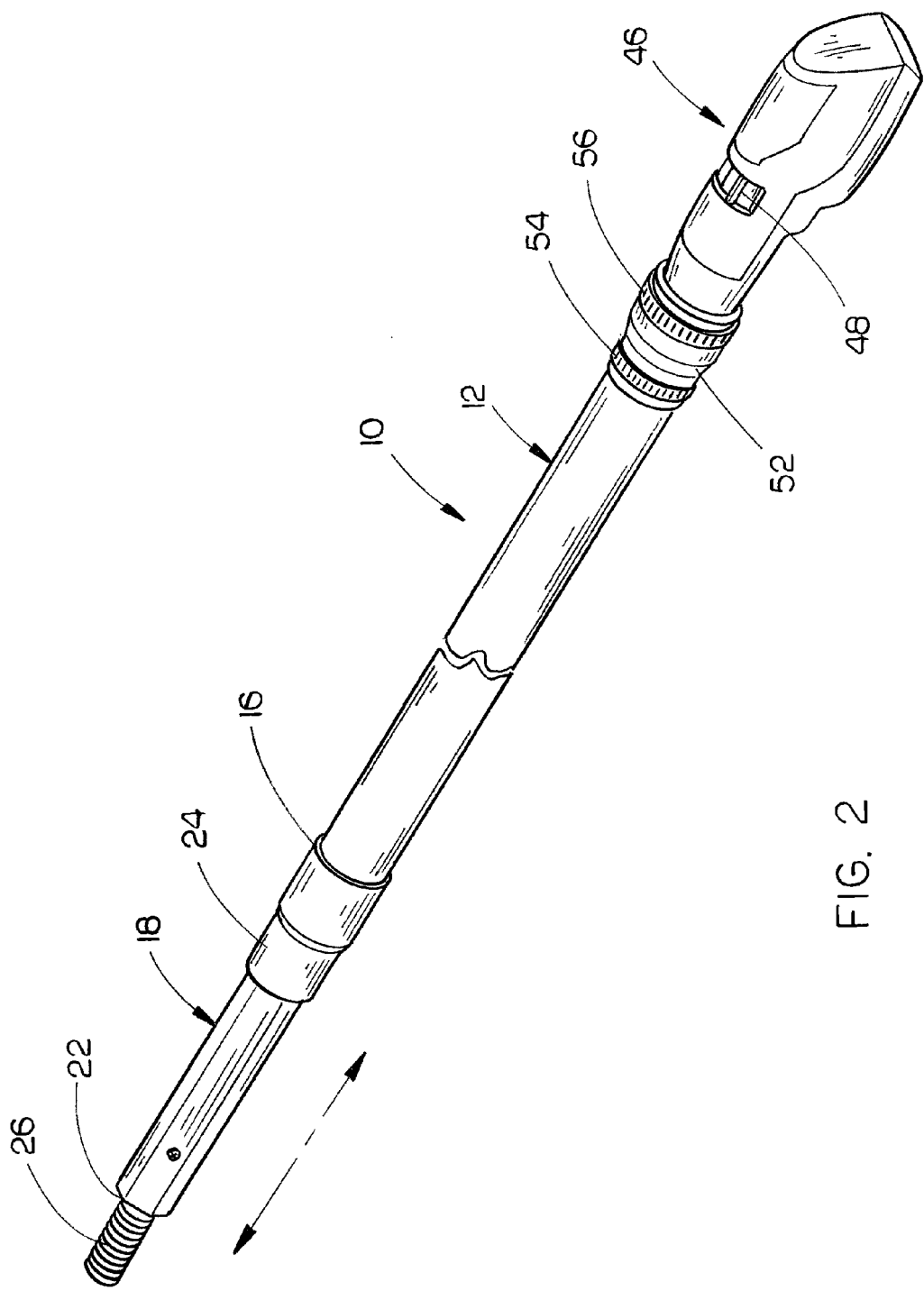
FIG. 2 is a partial perspective view of the extension pole of this invention.

When the extension pole 10 is being used such as illustrated in FIG. 1, the length of the extension pole may be increased or decreased simply by the operator actuating the motor of the tool 46 to either retract pole member 18 with respect to pole member 12 or to extend pole member 18 with respect to pole member 12. The extension and retraction of the pole member 18 with respect to pole member 12 is accomplished by the operator without the need for lowering the pole and then adjusting the length of the same such as is necessary in prior art extension pole devices.

Figure 5:
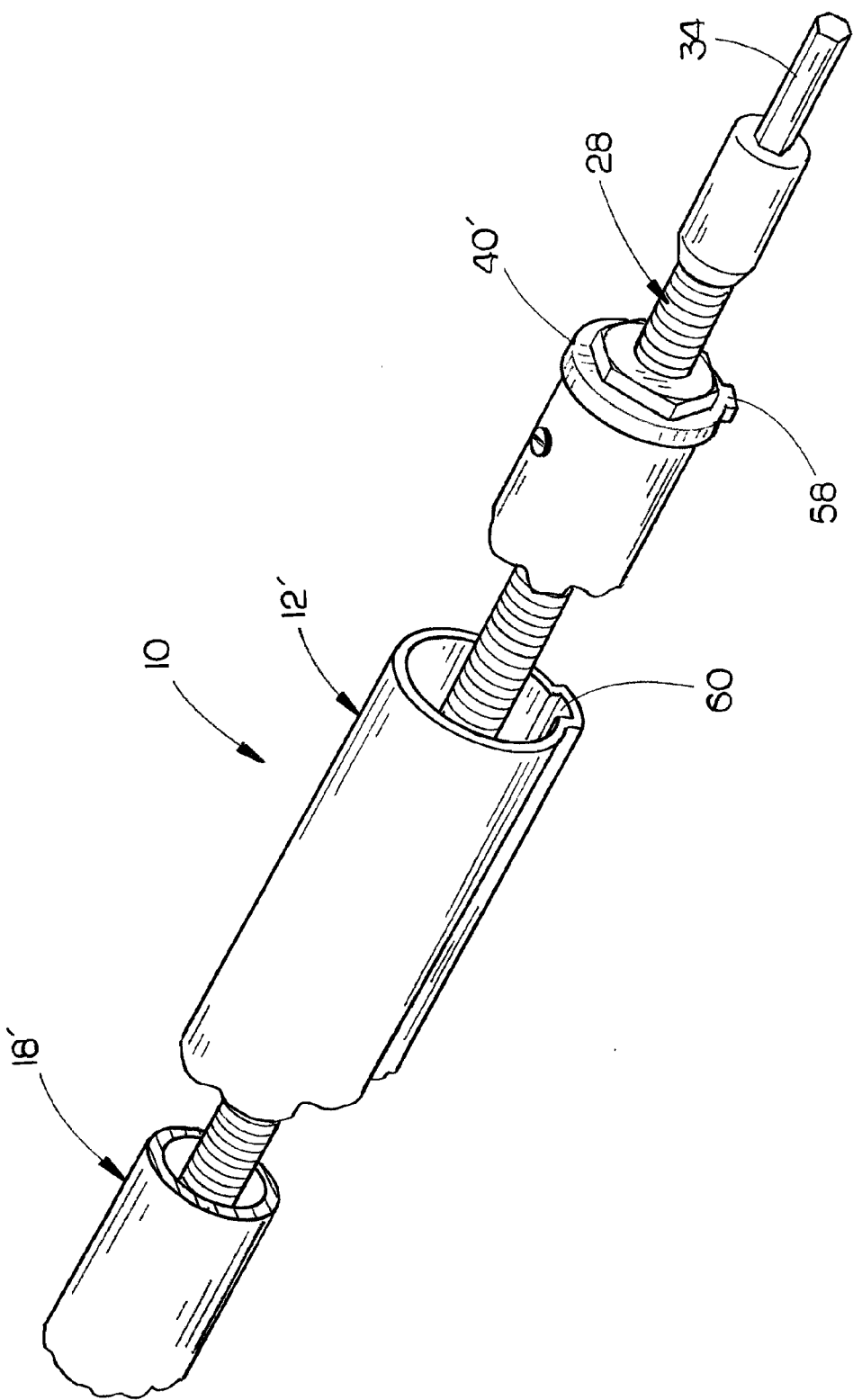
FIG. 5 is a partial sectional view illustrating a modified form of the extension pole wherein the inner and outer pole members are generally cylindrical.

FIG. 5 illustrates the means for preventing rotation of the inner pole member 18', which is generally cylindrical, with respect to the generally cylindrical outer pole member 12'. In the embodiment of FIG. 5, the collar 40' has a lug 58 projecting therefrom which is received by an elongated recess 60 provided on pole member 12'. During the extension or retraction of the inner pole member 18', the positioning of the lug 58 in the recess 60 prevents rotation of pole member 18' with respect to pole member 12'. Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A motorized extension pole, comprising:
   a first elongated, hollow pole member, having first and second ends;
   a fitting having first and second ends;
   said first end of said fitting being secured to said second end of said first pole member;
   said fitting having a hexagonal-shaped bore extending thereinto from said second end thereof;
   a second elongated hexagonal, hollow pole member, having first and second ends, telescopically mounted in said first pole member and which extends into said hexagonal-shaped bore of said fitting and into said second end of said first pole member;
   a collar in said first end of said second pole member and being fixed thereto;
   an internally threaded nut fixedly secured to said collar; said second end of said second pole member protruding from said second end of said first pole member;
   said second pole member being telescopically movable between retracted and extended positions with respect to said first pole member;
   a battery powered drive motor secured to said first end of said first pole member;
   said drive motor being selectively reversible;
   said drive motor including a rotatable driven member;
   an elongated externally threaded screw member having first and second ends;
   said first end of said screw member being coupled to said driven member for rotation therewith in a first direction and in a second direction opposite to said first direction;
   said screw member being threadably coupled to said internally threaded nut on said collar on said second pole member whereby rotation of said screw member in said first direction by said drive motor causes said second pole member to move from its said retracted position towards its said extended position and whereby rotation of said screw member in said second direction by said drive motor causes said second pole member to move from its said extended position towards its said retracted position;

the engagement of said second hexagonal pole member with said hexagonal-shaped bore in said fitting preventing said second pole member from rotating as it moves between its said retracted and extended positions and which prevents said second pole member from rotating as it moves between its said extended and retracted positions.

2. A motorized extension pole, comprising:

a first elongated, hollow pole member, having first and second ends;

a fitting having first and second ends;

said first end of said fitting being secured to said second end of said first pole member;

said fitting having an octagonal-shaped bore extending thereinto from said second end thereof;

a second elongated octagonal, hollow pole member, having first and second ends, telescopically mounted in said first pole member and which extends into said octagonal-shaped bore of said fitting and into said second end of said first pole member;

a collar in said first end of said second pole member and being fixed thereto;

an internally threaded nut fixedly secured to said collar;

said second end of said second pole member protruding from said second end of said first pole member;

said second pole member being telescopically movable between retracted and extended positions with respect to said first pole member;

a battery powered drive motor secured to said first end of said first pole member;

said drive motor being selectively reversible;

said drive motor including a rotatable driven member;

an elongated externally threaded screw member having first and second ends;

said first end of said screw member being coupled to said driven member for rotation therewith in a first direction and in a second direction opposite to said first direction;

said screw member being threadably coupled to said internally threaded nut on said collar on said second pole member whereby rotation of said screw member in said first direction by said drive motor causes said second pole member to move from its said retracted position towards its said extended position and whereby rotation of said screw member in said second direction by said drive motor causes said second pole member to move from its said extended position towards its said retracted position;

the engagement of second said octagonal pole member with said octagonal-shaped bore in said fitting preventing said second pole member from rotating as it moves between its said retracted and extended positions and which prevents said second pole member from rotating as it moves between its said extended and retracted positions.

\* \* \* \* \*